L. WHITE & H. S. RICHARDS.
APPARATUS FOR PREPARING PAVING MATERIAL.
APPLICATION FILED MAY 26, 1909.
1,058,342.
Patented Apr. 8, 1913.
8 SHEETS—SHEET 2.
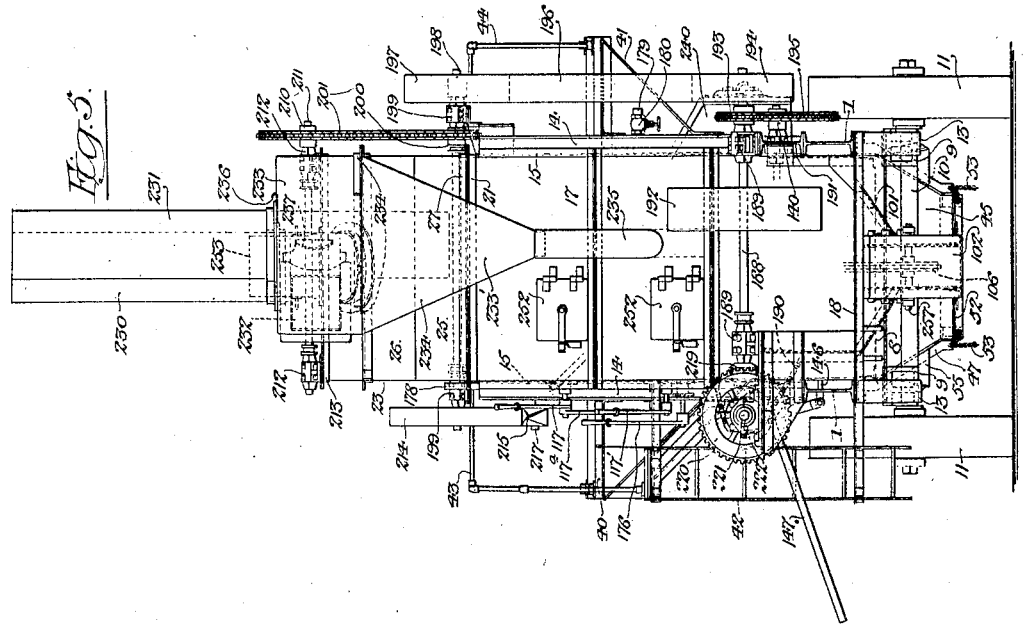
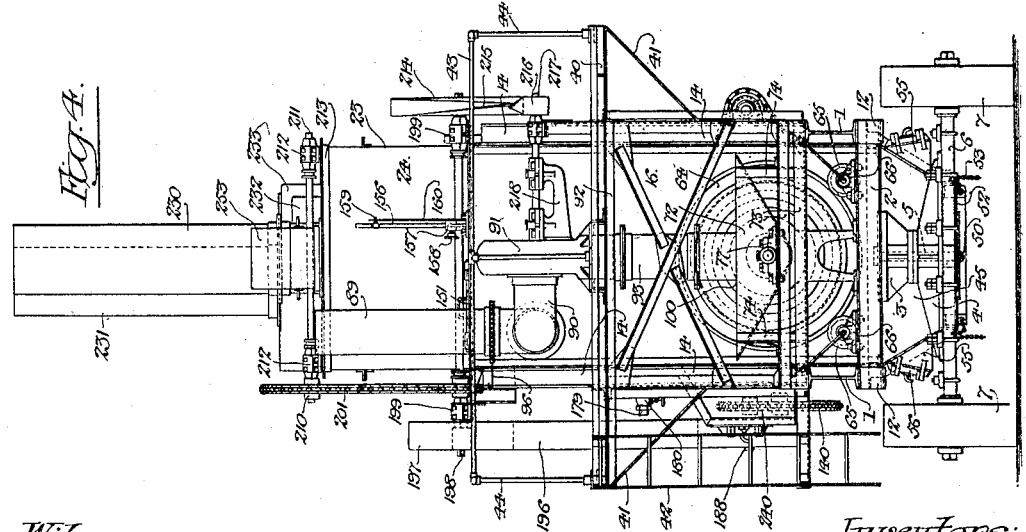

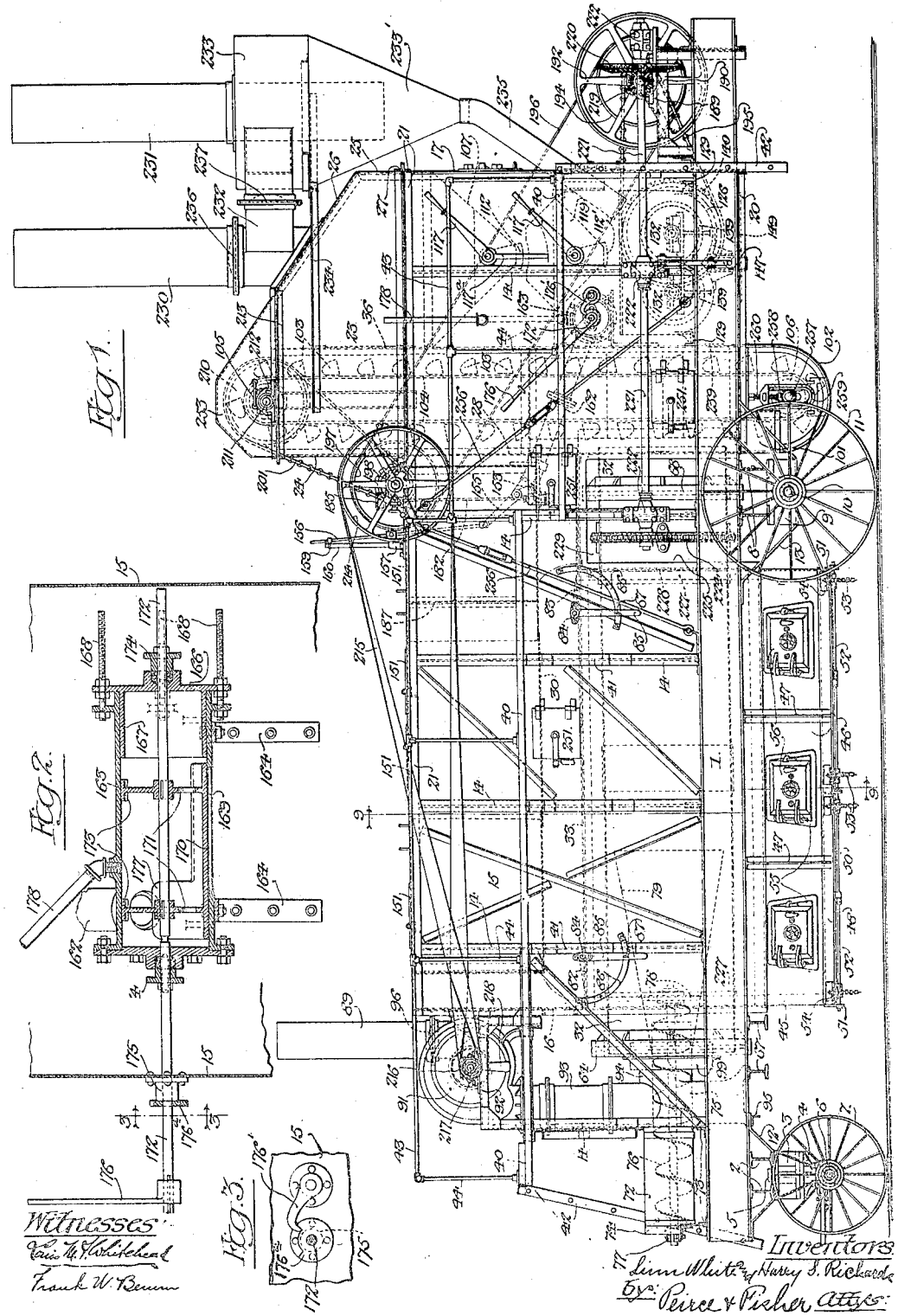

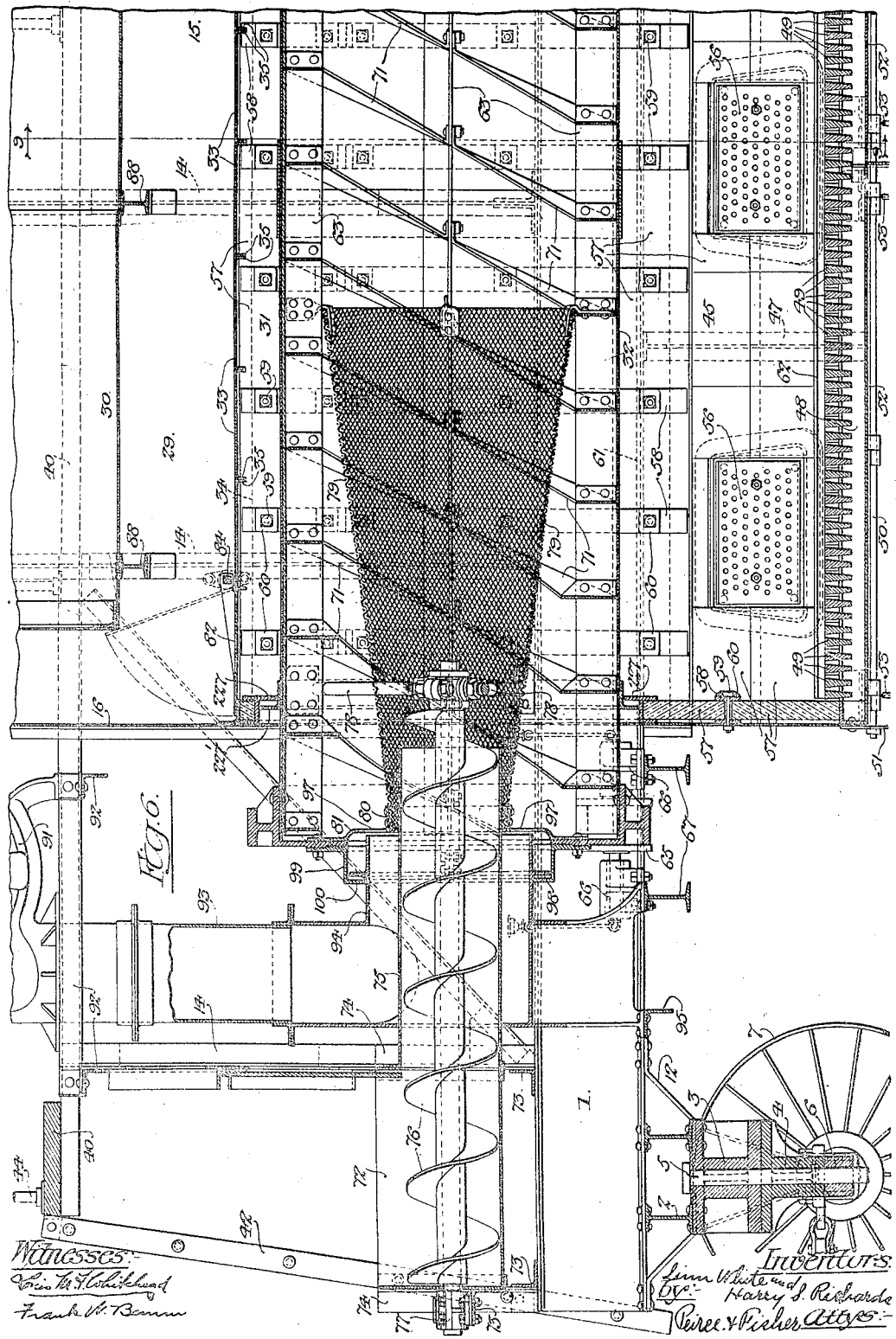

L. WHITE & H. S. RICHARDS.
APPARATUS FOR PREPARING PAVING MATERIAL.
APPLICATION FILED MAY 26, 1909.
1,058,342.
Patented Apr. 8, 1913.
8 SHEETS—SHEET 4.
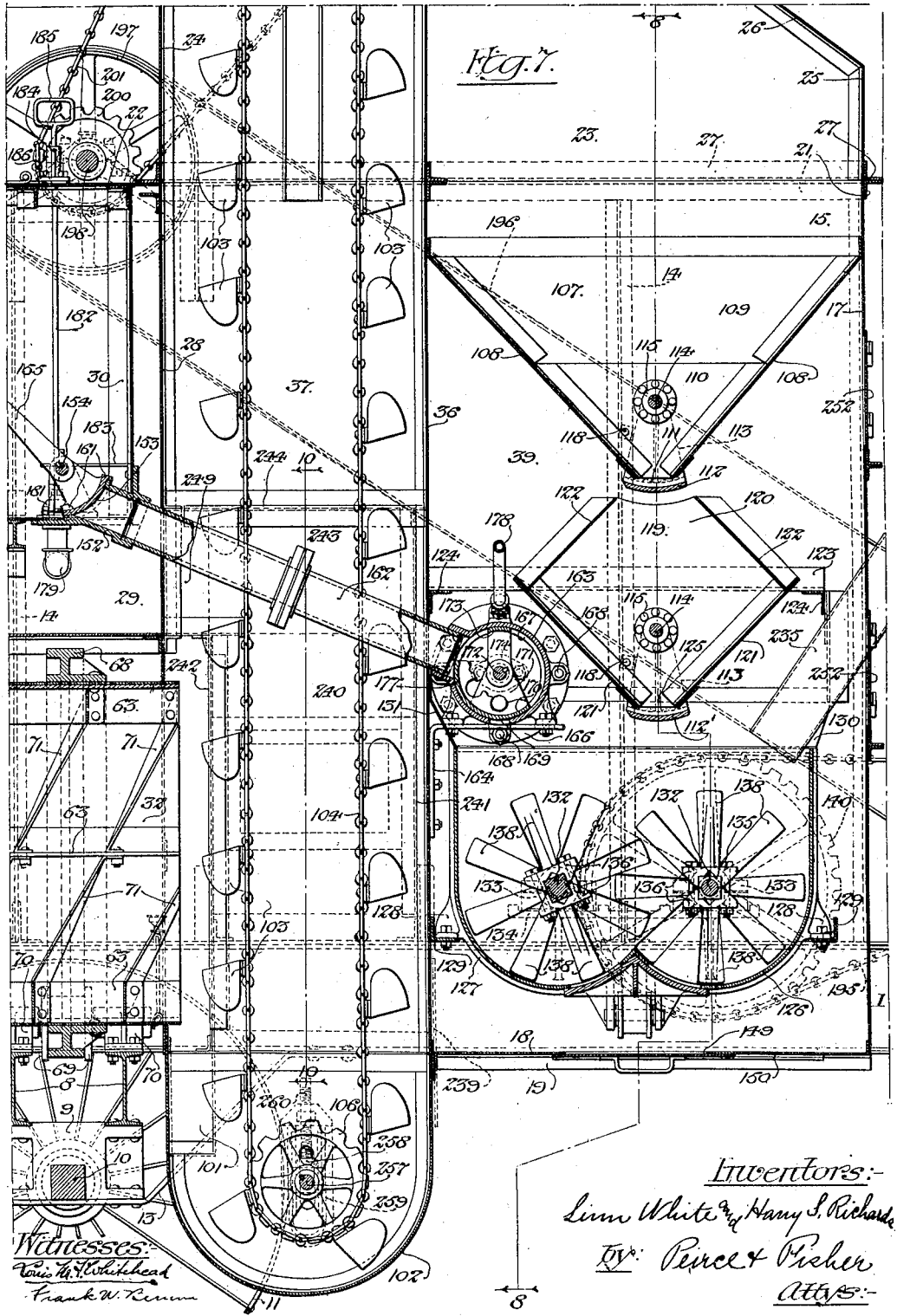

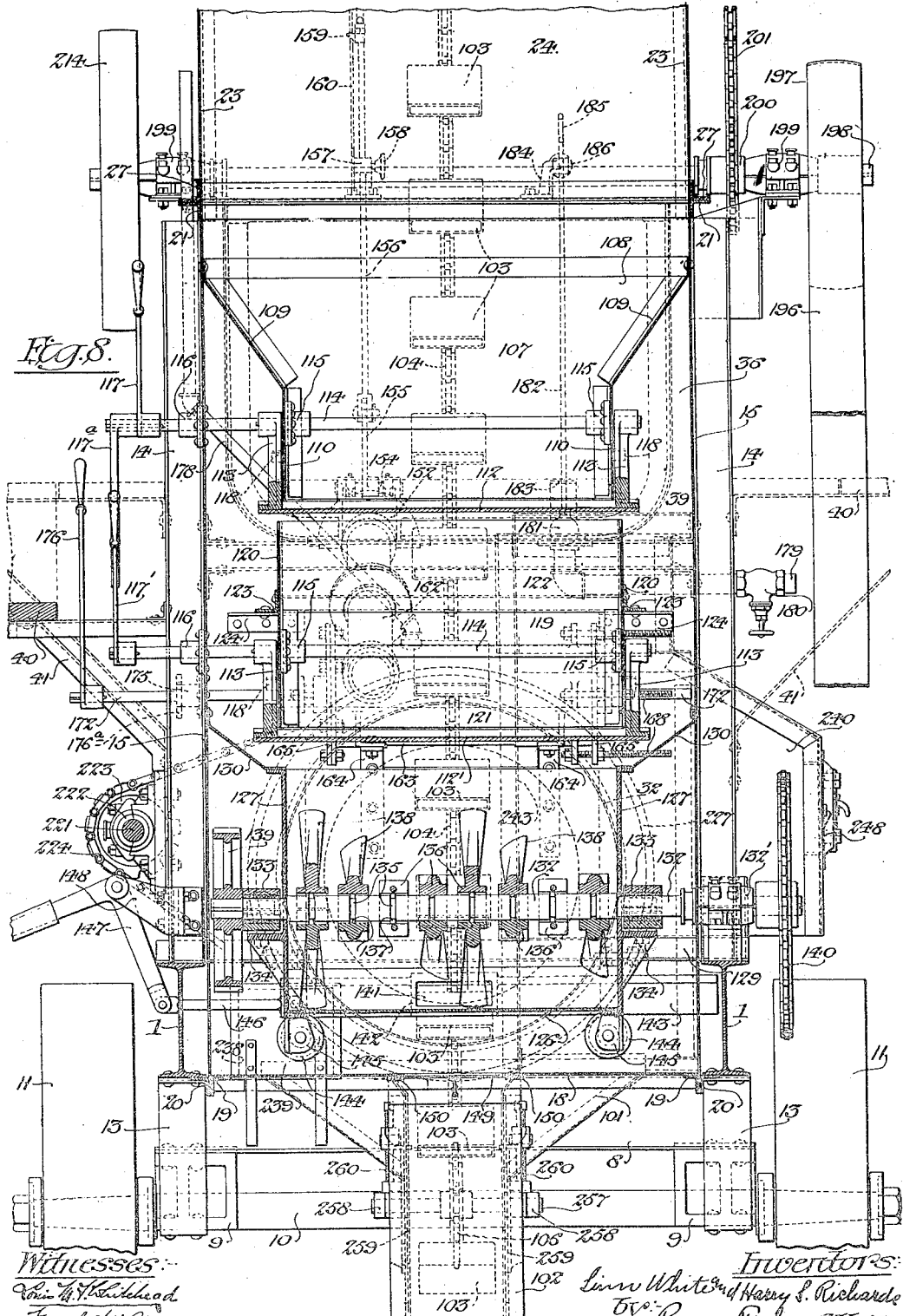

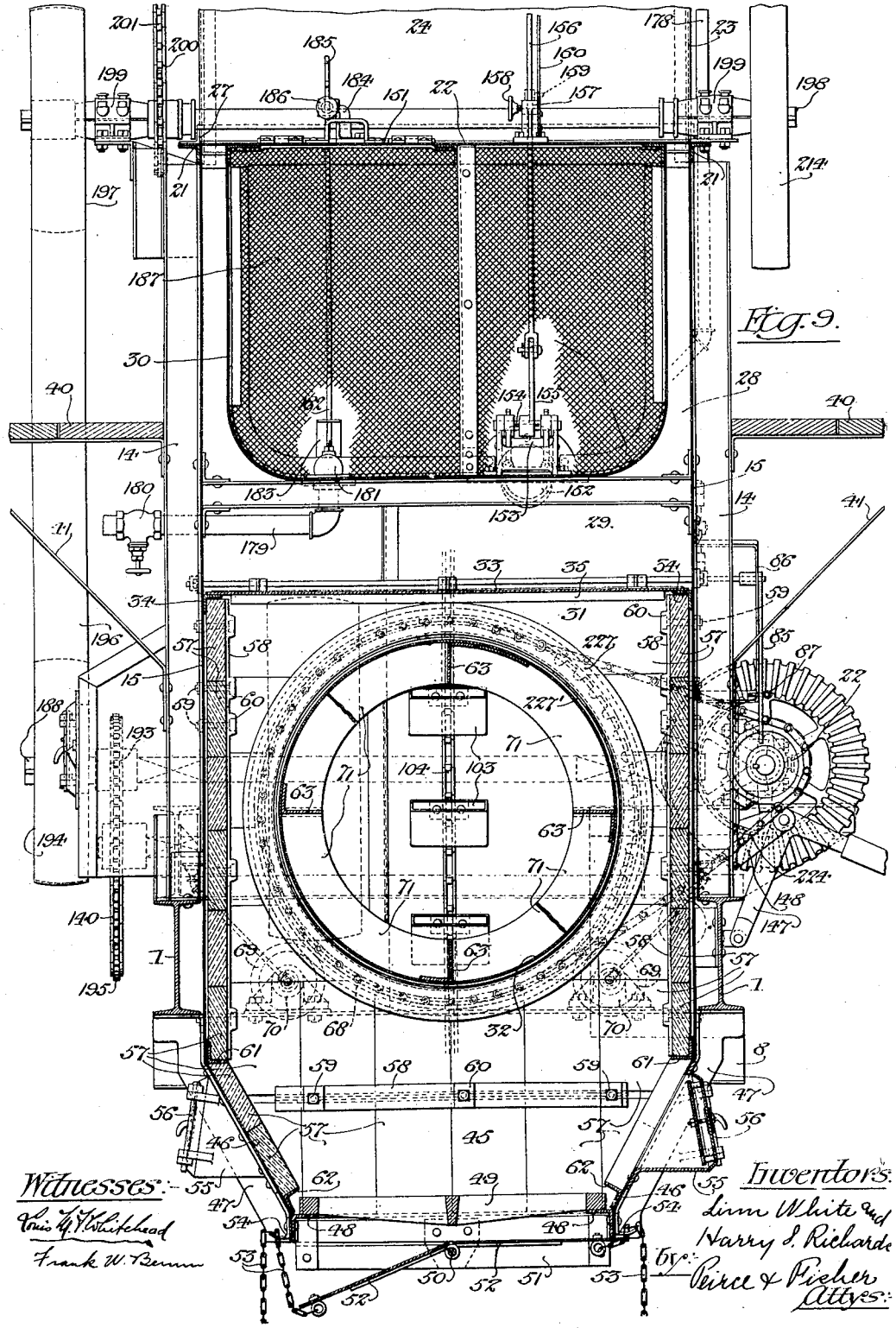

L. WHITE & H. S. RICHARDS.
APPARATUS FOR PREPARING PAVING MATERIAL.
APPLICATION FILED MAY 26, 1909.
1,058,342.
Patented Apr. 8, 1913.
8 SHEETS—SHEET 7.
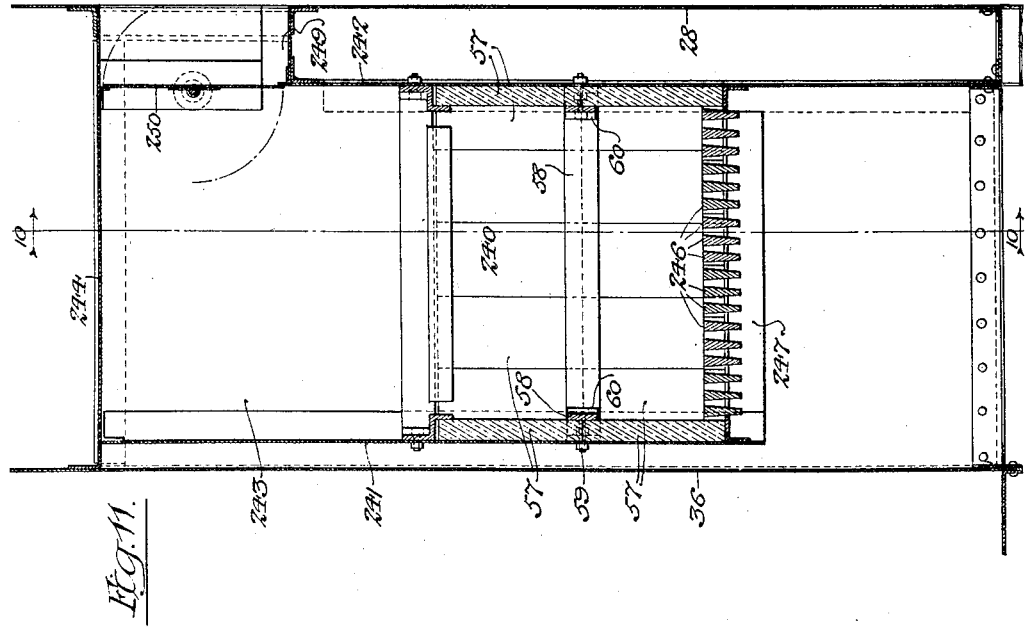
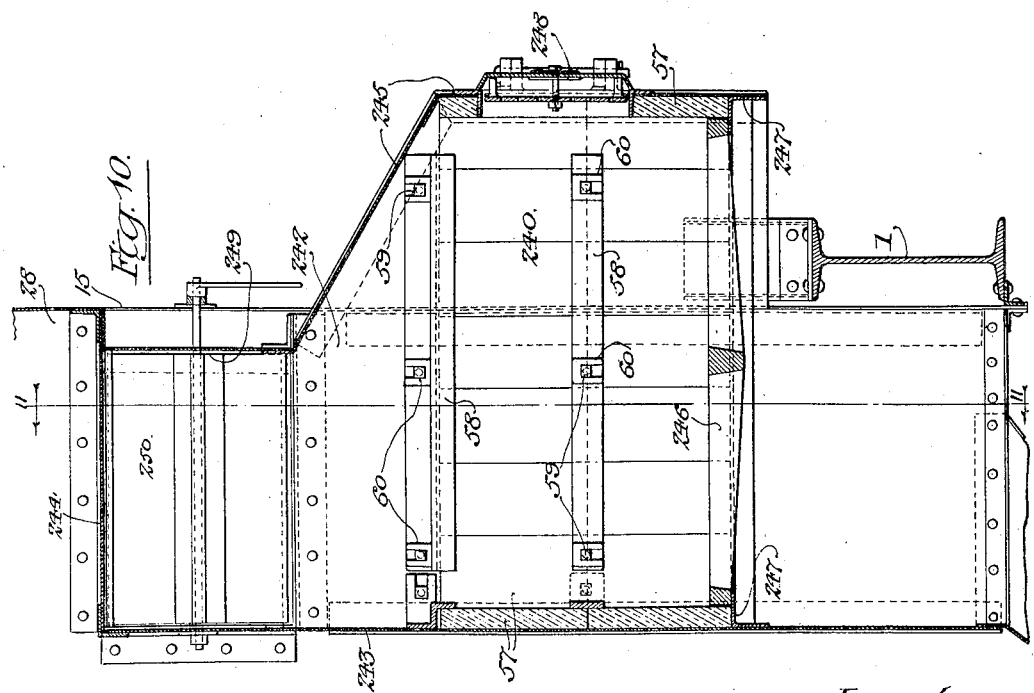

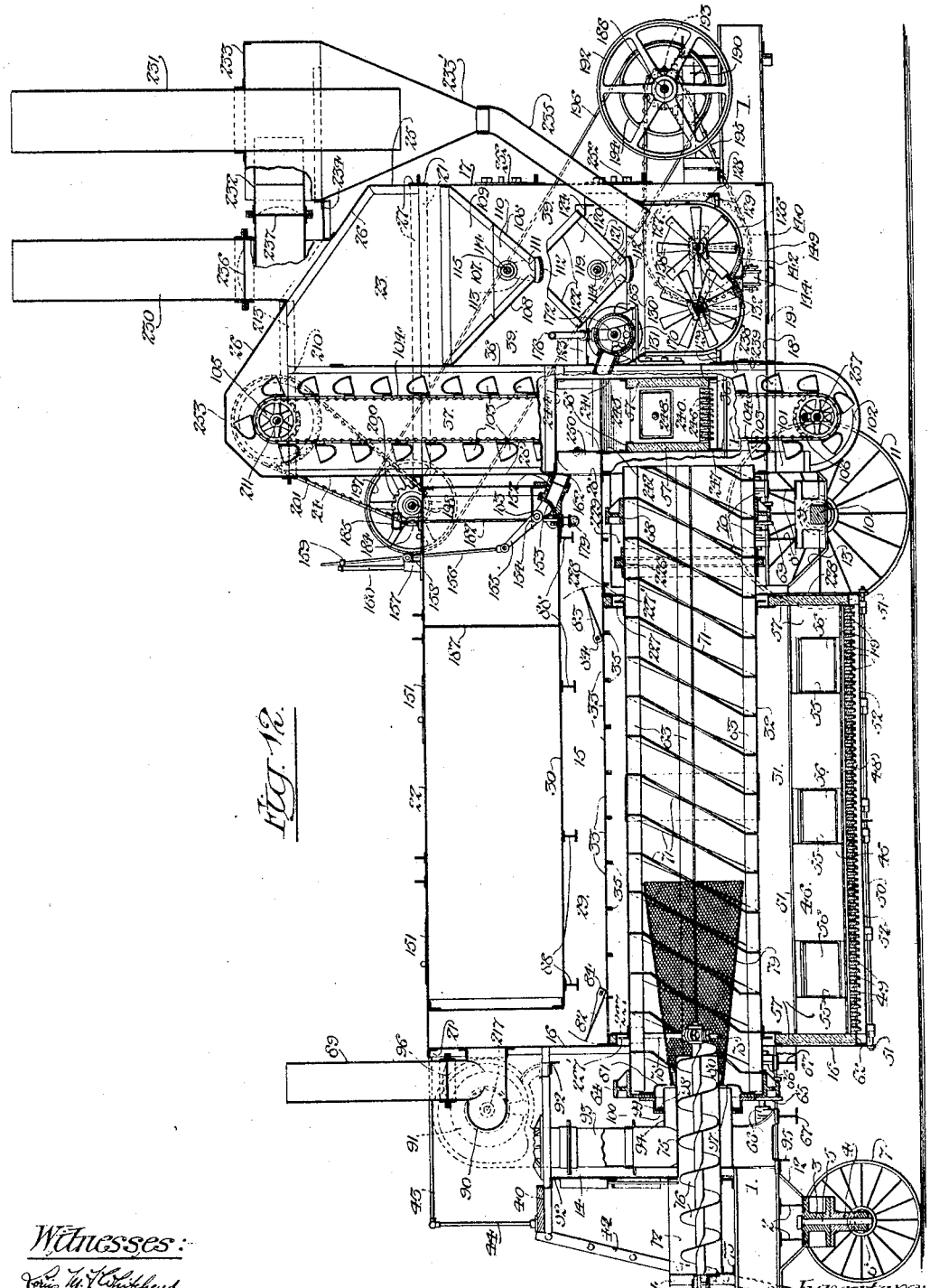

UNITED STATES PATENT OFFICE.

LINN WHITE AND HARRY S. RICHARDS, OF CHICAGO, ILLINOIS, ASSIGNORS TO TWENTIETH CENTURY PORTABLE PAVING MACHINE COMPANY, OF CHICAGO, ILLINOIS, A CORPORATION OF ARIZONA.

APPARATUS FOR PREPARING PAVING MATERIAL.

1,058,342.  Specification of Letters Patent.  Patented Apr. 8, 1913.

Application filed May 26, 1909. Serial No. 498,439.

*To all whom it may concern:*

Be it known that we, LINN WHITE and HARRY S. RICHARDS, citizens of the United States, and residents of Chicago, county of Cook, and State of Illinois, have invented certain new and useful Improvements in Apparatus for Preparing Paving Material, of which the following is a specification.

The invention relates to apparatus for preparing asphalt or like paving material which is provided with means for melting the asphalt, bitumen or the like, drying the mineral aggregate and mixing the materials preparatory to applying the same to the road-bed or other part to be paved.

More particularly the invention relates to portable apparatus which can be readily transported from place to place, and the pavement material prepared and applied in position without loss of heat.

The invention seeks to provide a simple and efficient apparatus of this type by which the paving material can be readily and economically prepared and consists in the features of improvement hereinafter set forth, illustrated in the accompanying drawings and more particularly pointed out in the appended claims.

In the drawings, Figure 1 is a view in side elevation of the improved apparatus. Fig. 2 is a detail section of the measuring valve for the asphalt, bitumen or the like. Fig. 3 is a detail section on the line 3—3 of Fig. 2. Fig. 4 is a front view of the improved apparatus. Fig. 5 is a rear view thereof. Fig. 6 is a longitudinal section of the front portion of the apparatus. Fig. 7 is a longitudinal section of the rear portion thereof. Fig. 8 is a cross section on the line 8—8 of Fig. 7. Fig. 9 is a cross section on the lines 9—9 of Figs. 1 and 6. Fig. 10 is a transverse section on the line 10—10 of Figs. 7 and 11, illustrating the supplemental firebox. Fig. 11 is a section on the line 11—11 of Fig. 10. Fig. 12 is a central longitudinal section of the machine with parts broken away to show the supplemental furnace.

The frame of the machine is formed of structural steel beams and bars. A pair of heavy I-beams 1 form the side sills of the machine. A pair of transverse I-beams 2 extend beneath and are secured to the forward ends of the side sills and to the upper face of a pedestal 3 which rests upon a bolster 4. The pedestal and bolster are connected by a king pin 5 (see Figs. 4 and 6) and the front axle 6, whereon the front wheels 7 are journaled, is suitably secured to the bolster 4. A similar pair of I-bars 8 extend beneath and are secured to the side sills 1 at a point in rear of the center of the machine and rest upon and are secured to bolster brackets 9. The rear axle 10 is fixed to the bolster brackets and the rear wheels 11 are journaled thereon. Brace bars 12 are secured to the lower edges of the sills 1 and extend beneath and are secured to the lower edges of the channel bars 2, and similar brace bars 13 secured to the lower edges of the sills extend beneath and are secured to the bolster brackets 9.

A series of upright I-bars 14 are secured at their lower ends to the side sills 1. Metal sheathing is secured to the inner faces of the uprights 14 (see Figs. 8 and 9) and forms the side walls 15 of a casing within which the drier, melting tank and mixing apparatus are arranged. The inclosing casing is shorter than the side sills 1 and the front and rear end portions of the latter extend beyond the ends of the casing, as most clearly shown in Fig. 1. The casing is provided with a front wall 16 (see Figs. 6 and 12), a rear wall 17 (see Figs. 7 and 12) and its rear end portion is closed by a bottom wall 18 (see Figs. 7 and 8). These walls are all preferably formed of sheet metal and together with the side walls are suitably strengthened at their edges and, wherever necessary, by angle bars secured to their outer faces. The bottom wall 18 at the rear lower portion of the casing is secured at its edge by an angle bar 19 to the lower edges of the side walls 15 (see Fig. 8) and the lower edges of the side walls at this point are connected by angle bars 20 to the lower flanges of the side sills 1. Angle bars 21 are secured to the upper edges of the side walls 15, and the front and rear walls 16 and 17, and a sheet metal top 22 extending over the front portion of the casing is secured at its edges to the angle bars 21 (see Fig. 9). The rear portion of the casing extends above the top wall 22 in the form of an inclosing hood, which has side walls 23, front and rear end walls 24 and 25 and a top wall 26. These walls are formed of sheet metal and are secured at their lower edges to angle bars 27 that are fixed to the angle bars 21 at the upper edges of the side and rear end walls of the main casing. The hood thus forms part of and is open at its bottom into the main casing.

A vertical transverse partition wall 28 (see Figs. 17 and 12) is arranged substantially in line with the front wall 24 of the hood and divides the casing into front and rear portions. The front portion of the casing is divided by a transverse horizontal partition into an upper chamber 29 (see Figs. 1, 6, 9, and 12) in which a melting tank 30 is arranged and a lower chamber 31 wherein the sand or gravel drier 32 is located. This partition is formed of a series of transverse plates 33 extending between angle bars 34 that are fixed to the inner faces of the side walls 15. The plates 33 have downturned abutting edges 35 (see Fig. 6), which are secured together and serve as transverse strengthening ribs for the partition. A vertical transverse partition 36 arranged in rear of the partition 28 divides the rear portion of the machine into an elevator shaft 37 and a rear compartment 39 within which the measuring and mixing devices are arranged.

An elevated running board 40 extends around the side and front of the machine and is supported in position by angle brackets 41 mounted upon the upright channel bars 14. Ladders 42 at the front and rear of the machine lead to the running board and the latter is preferably provided with a hand rail 43 which is carried by uprights 44 that are fixed at their lower ends to the outer edge of the running board.

A fire-box 45 is arranged at the lower portion of the chamber 31 within which the cylindrical drier is arranged. This fire-box extends to the front wall 16 of the casing and to the front end of the chamber 31, but terminates short of the rear end of the cylinder 32, as shown in Figs. 1 and 12. The fire-box is provided with converging side walls 46 secured to inwardly inclined T-bars 47 that are fixed at their upper ends to the lower faces of the side sills 1. At the lower ends the T-bars 47 carry angle bars 48 upon which the grate bars 49 for the fire-box are mounted. A rod 50 extends longitudinally beneath the grate bars 49 and midway between the ends thereof. This rod is supported at its ends in cross bars 51 that are suitably supported at their ends from the angle bars 48. Dampers 52 are hinged to the rod 50. Chains 53 are connected to the outer edges of the dampers 52 and are arranged to engage hooks 54 fixed to the lower edges of the walls of the fire-box, so that the dampers may be held closed or at any desired inclination (as indicated in Fig. 9) to regulate the admission of air to the fire-box. Offset or projecting portions 55 are provided upon the opposite side walls 46 of the fire-box, as shown, with stoking doors 56.

The side and end walls of the fire-box and of the drying chamber 31 are lined with fire brick or tile 57. For convenience in making repairs, the fire brick or tile is not cemented in position, but is removably held in place by bars 58 which engage the inner edge portions thereof and which are secured in position by bolts 59 that extend between the fire brick and through the walls of the chamber 31 and fire-box 45. The bars 58 are provided with bosses 60 that are recessed to receive the heads of the bolts 59 so that the latter will not be damaged by the heat. The upper course of fire brick or tile in the chamber 31 engages the angle bars 34, as shown in Fig. 9. The lower course rests upon angle bars 61 secured to the lower edges of the side walls 15. The lower course of tile in the fire-box 45 rests upon angle bars 62 that are secured to the lower edges of the side walls 46.

The cylindrical drier 32 that extends through the chamber 31 is formed of sheet metal and is suitably strengthened by a series of longitudinally extending angle bars 63. The front end of the drier projects through an opening in the walls 16 at the front of the chamber 31 and is provided with a cast metal ring 64. This ring engages the front supporting rollers 65. The shafts of these rollers are journaled in suitable bearing brackets 66 mounted upon a pair of transverse I-beams 67 that extend beneath and are secured to the side sills 1. At its rear end the drier cylinder 32 is provided with a similar ring 68 (see Figs. 7, 9, and 12) that is carried upon the rear supporting rollers 69. The shafts of these rollers are journaled in brackets 70 that are mounted upon the transverse I-beams 8 above the rear axle. The drier cylinder is thus rotatably sustained in horizontal position. The inwardly projecting flanges of the longitudinal brace bars 63 thereof act as blades for lifting the sand and gravel or the like, which is to be dried in the cylinder, so that this material is thoroughly mixed and all portions thereof brought into contact with the outer heated surface of the drier cylinder. To feed the material through the cylinder, it is provided with a series of spiral blades 71. Each of these blades is preferably of proper length to fit between two of the longitudinal brace bars 63 and is removably bolted to the brace bars. By this arrangement, the time required to feed material through the drier can be increased by removing some of the blades 71. This is often desirable since the amount of moisture contained in the sand and gravel to be dried varies considerably at different seasons of the year and with the varying atmospheric conditions. For example, if the mineral aggregate is very wet, every second or every third blade or a number of adjacent blades in the central portion of the cylinder can be omitted and the time required to convey the material through the drier will be correspondingly increased and effective drying attained.

At its extreme forward end, the machine is provided with a hopper 72 (see Figs. 1, 6 and 12) for receiving the sand, gravel, crushed stone or the like forming the mineral aggregate of the paving material. This hopper is sustained in position from the front end of the side sills 1 by transverse and upright angle bars 73 and 74. It has inwardly inclined bottom walls and at its rear end communicates with the interior of the drying cylinder through the medium of a conveyer tube 75. This conveyer pipe extends well within the end of the drying cylinder, as shown, and a screw conveyer 76 extends through this pipe and through the central portion of the receiving hopper 72. At its outer end the screw conveyer is journaled in a bearing 77 fixed to one of the transverse angle bars 73. At its inner end the shaft of the conveyer is rigidly secured to the shell of the drying cylinder by a series of radial brace bars 78, so that the screw conveyer rotates with the cylinder to feed the material from the receiving hopper 72 through the tube 75 and into the cylinder.

The inlet end of the drying cylinder is provided with a conical screen 79. The large inner end of the screen is secured to the brace bars 63. Its small outer end surrounds the inner end of the conveyer tube 75 and is fixed to a ring 80 formed on a plate 81 that is fixed to the cast metal ring 64. The sand and fine material delivered into the drying cylinder will pass through the screen 79 and will thus come in contact with the outer heated wall of the drying cylinder in advance of the coarser material or gravel. It is more difficult to dry the fine material and sand than it is the coarser material and by this arrangement the sand is given an effective preliminary drying. The mineral aggregate which is to be mixed with the asphalt is thus effectively dried without unduly increasing the length of the drying cylinder.

The gases of combustion pass upwardly from the fire box around the drying cylinder 32 in the chamber 31 and into the chamber 29 through openings in the partition formed by the plates 33. There is one of these openings at each end of this partition and they are controlled respectively by dampers 82 and 83 (see Figs. 1, 6 and 12.) These dampers are fixed to shafts 84 that project through the side walls of the casing and have handles 85 thereon. These handles move over segments 86 on the outer face of the casing and pins 87 are arranged to extend through the holes in the handles and segments and secure the dampers either in open or closed position.

The melting tank 30 is supported within the chamber 29 upon transverse I-beams 88 that are fixed at their ends to the upright eve-bars 14. The tank terminates short of the front wall 16 of the casing, so that a space is left between the end of the tank and this wall which communicates with a short upright stack 89 and also, through the medium of an elbow pipe 90 (see Fig. 4) with the casing of a centrifugal fan 91. This fan is supported upon transverse angle bars 92 extending between the front uprights 14 and discharges into a vertical pipe 93 that communicates with a horizontal pipe or drum 94. The pipe or drum 94 is supported from one of the I-beams 67 and from a transverse angle bar 95 and surrounds the conveyer pipe 75.

The stack 89 is provided at its lower end with a sliding damper 96 (see Figs. 4 and 12), which, however, is normally closed. When the fan is in operation the gases of combustion are drawn through the chamber 31 through one or through both of the openings controlled by the dampers 82 and 83, through the chamber 29 and are forced through the pipes 93 and 94 into the drying cylinder 32, so that the fuel consumed is economically and effectively utilized in melting the asphalt or bitumen and in drying the mineral aggregate. The pipe 94 surrounds the conveyer pipe 75 and gives the sand and gravel a preliminary heating before it passes into the drier proper. The plate 81 opposite the inner discharge end of the pipe 94 is cut away to provide air inlet opening 97. Adjacent its inner end the pipe 94 is provided with an outwardly projecting flange 98 and a ring 99 fixed to the cast metal ring 64 is provided with an inwardly projecting flange 100 that overlaps the flange 98 so as to prevent the escape of the gases of combustion at the inlet end of the drying cylinder.

The discharge end of the drying cylinder 32 extends through an opening in the partition wall 28, and delivers the dried sand and gravel into a hopper 101 at the lower end of the elevator shaft 37 (see Figs. 7, 8 and 12). This hopper is provided with downwardly and inwardly inclined bottom walls and conducts the gravel into a semi-cylindrical casing 102 at the lower end of the elevator shaft 37. A bucket elevator is arranged within this shaft and comprises a series of buckets 103 mounted on a chain 104 that passes over sprocket wheels 105 and 106 at the upper and lower ends of the elevator shaft. The partition 36 extends well up into the hood at the rear end of the casing, but terminates short of the top wall thereof, so as to leave an opening between the top of the elevator shaft and the chamber 39. The chain wheel 105 is located in the upper end of the elevator shaft in the upper portion of the hood and the dried mineral aggregate is carried by the buckets to the upper end of the elevator shaft and into the upper end of the compartment 39 and is collected in a storage hopper 107 in the upper portion thereof. This hopper has downwardly and inwardly inclined side walls 108 and end walls that have inclined upper portions 109 and vertical lower portions 110. The walls of the storage hopper are secured at their upper edges to the walls that form the chamber 39.

The side walls 108 of the storage hopper are spaced apart to leave a narrow, transverse discharge opening 111. This opening is closed by a swinging gate in the form of a transverse plate 112 that has a concave upper face and is fixed at its ends to arms 113. These arms extend upwardly outside of the end plates 110 on the hopper and are secured at their upper ends to a transverse shaft 114 that is journaled in suitable bearings 115 on the plates 110. This shaft extends outwardly through a bearing 116 in one of the side plates 15 and is provided at its outer end with a handle 117 (see Fig. 1). The end plates 110 of the hopper are provided with projecting stop lugs 118 (see Fig. 7) and the parts of the valve or gate are so arranged that it is normally held by gravity in closed position with the arms 113 engaging the stops 118. The gate does not fit closely against the bottom of the hopper, but is sufficiently wider than the transverse slit or opening 111 as to prevent the escape of sand and gravel from the hopper when it is in closed position. By shifting the handle 117 the operator may shift the gate 112 and thereby permit the sand and gravel to drop into the measuring hopper 119. By returning the gate to position shown in the drawings the passage from the storage hopper to the measuring hopper is cut off. The forward edge of the gate 112 is beveled, as shown in Fig. 7, to facilitate the cutting off of the stream of mineral aggregate.

The measuring hopper comprises end walls 120, outwardly flaring, inclined, lower side walls 121 and converging inclined upper side walls 122. The hopper is supported by a pair of angle bars 123 which are secured to the sides 120 thereof and which in turn are fixed at their ends to a pair of transverse angle bars 124. The lower edges of the side walls 121 are spaced apart to form a narrow, transverse discharge opening 125 which is controlled by a gate 112' that is similar in all respects to the gate 112 of the storage hopper and is similarly controlled from the exterior of the machine casing by an operating handle 117'. With the valve 112 open and the valve 112' shut the measuring hopper will be filled with sand and gravel. Even if the valve 112 is left open the measuring hopper will not overflow since the converging upper side walls 122 thereof terminate closely adjacent the opening of the storage hopper and incline upwardly at about the angle which would be naturally assumed by the pile of gravel. By closing the gate 112 and opening the gate 112' the measured quantity of sand and gravel will pass into the mixing tank 126. The valves 112 and 112' are returned to their normal closed position by gravity. The construction and arrangement of the storing and measuring hoppers and of the controlling gates therefor are such that the sand and gravel can be readily transferred without loss and in measured quantities, to the mixing tank 126. To prevent the simultaneous opening of both the valve 112 and 112', an arm 117ª (see Fig. 1) depends from the shaft of valve 112 and is arranged to engage the lever 117' and lock the valve 112' in closed position when valve 112 is open. It is thus impossible for the mineral aggregate to pass directly from the storage hopper into the mixing tank.

The mixing tank 126 has cast iron end walls 127 having projecting lugs 128 that rest on and are bolted to a pair of transverse angle bars 129. These end walls are connected at their upper ends to the side walls 15 of the chamber 39 by upwardly inclined sheet metal pieces 130. The sheet metal body of the tank 126 is connected at its upper inner edge by an inclined plate 131 to the transverse partition wall 36 and has a double curved bottom the portions of which are concentric with a pair of square shafts 132 which extend through the mixing tank and are provided with cylindrical end portions or journals arranged in suitable bearings 133. These bearings are mounted on projecting lugs 134 on the end walls of the tank. The shafts 132 (see Fig. 8) are provided with a series of annular grooves 135 and a series of split hubs 136 are bolted to the shaft and are provided with lugs 137 adapted to enter the grooves 135. These hubs are provided each with a pair of radially projecting blades 138, the faces of which are inclined to the axes of the respective shafts. By loosening the bolts which secure the split hubs to the shafts the blades can be readily secured in position in different angular relations. Preferably they are arranged in a spiral, as indicated in Fig. 8, about the shafts. The shafts are provided at one end with a pair of intermeshing gears 139, so that the shafts on the two sets of blades revolve in opposite directions. At its opposite end one of the shafts is provided with an extended portion journaled in a bearing 132' on the sill 1 and is provided with a sprocket wheel 140 by which the mixing blades are operated.

The bottom of the mixing tank on opposite sides of the central ridge thereof and midway between the ends of the tank, is provided with two discharge openings 141 which are normally closed by a slide or gate 142 that is of inverted V-shape and provided with two oppositely inclined curved walls. This slide or gate is preferably cast in piece with a guide bar 143 which passes over a pair of rollers 144. These rollers are journaled in lugs 145 that depend from the lower edges of the end walls 127 of the mixing tank. A rod 146 pivoted to one end of the guide bar 143 extends outwardly through openings in the adjacent side wall 15 and in the adjacent side sill 1 and is connected to one arm of a bell-crank lever 147 that is journaled in a bracket 148 on one of the upright channel bars 14. The bottom wall 18 of the chamber 39 is provided with a discharge opening beneath the openings 141 which can be closed by a sliding plate or gate 149 and arranged to shift in guides 150 fixed to the bottom plate 18. This gate is open during the normal operation of the machine, so that when the slide 142 is shifted by means of the lever 147 the mixed mineral aggregate and bitumen is discharged therethrough and through the opening in the bottom plate 18 onto the ground or into a suitable wheeled receptacle by which it can be transported to the point where it is to be laid.

The asphalt, tar, pitch or bitumen to be used in the paving mixture is melted in the tank 30 located in the chamber or compartment 29. The tank is supported, as stated, upon the transverse I-bars 88 and its bottom, side and end walls are spaced apart from the corresponding walls of the compartment. The wall 22, however, forms the top wall both of the compartment and of the tank. This wall is provided with a number of openings normally closed by hinged doors 151 and through which the asphalt, bitumen or the like to be melted can be placed in the tank. At the rear end of its bottom, the tank is provided with a cut-off valve casing 152 having a segmental cut-off valve 153. This valve is fixed to a short transverse shaft 154 that is journaled in projecting side lugs on the valve casing 152 (see Figs. 7 and 9). An arm 155 on this shaft is connected to the lower end of an operating rod 156 that extends upwardly through the top plate 22 and through a bracket 157 thereon. A set screw 158 threaded through the bracket engages the rod and holds it and the valve in adjusted position. The rod is provided with a pointer 159 which coöperates with an upright piece 160 secured to the bracket 157 to indicate the position of the cut-off valve. The piece 160 is provided with notches at its ends and the pointer 159 is arranged to engage these notches in the extreme open and closed positions of the cut-off valve. The cut-off valve (see Fig. 7) is preferably provided with lugs 161 which engage portions of the valve casing in the closed position of the valve. The cut-off valve casing of the tank communicates with a downwardly and rearwardly inclined pipe 162 that leads to a measuring valve casing 163. This measuring valve casing is in the form of a transverse horizontal cylinder and is mounted upon a pair of angle brackets 164 within the compartment 39 and upon the face of the partition wall 36. The cylindrical casing 163 is provided with a fixed head 165 and an adjustable head 166 (see Fig. 2) that has a sleeve portion 167 tightly fitting within the end of the cylindrical casing. The head 166 is adjustably connected by bolts 168 to the casing 163 and by changing the position of this head the capacity of the measuring valve casing 163 can be varied. The valve casing is located, as shown, above the mixing tank 126 and is provided at its bottom portion with a longitudinally extending discharge opening 169 that is normally closed by a segmental valve plate 170. This plate is fixed upon the lower ends of a pair of arms 171 which are keyed intermediate their ends to a shaft 172 extending through the valve casing 163. The upper ends of the arms are provided with bearing portions 173 that engage the upper portion of the cylindrical casing. The shaft 172 extends through stuffing boxes 174 in the heads 165 and 166 and one end thereof extends through a bearing 175 on the left hand side plate 15 and a hand lever 176 (see Figs. 1 and 8) is secured to the end of the shaft. At one end the valve plate 170 is provided with a projecting portion 177 which, when the valve is shifted to open the discharge opening 169, closes the inlet to the valve casing from the pipe 162. The contents of the measuring valve casing 163 will then be discharged into the mixing tank. The valve 170 is so arranged and proportioned that it will be normally held by gravity in its closed position shown in the drawings, and it is also so proportioned that when the inlet to the casing is opened the discharge opening 169 will be closed and when the latter is opened the inlet will be closed. To permit the ready entrance and discharge of melted asphalt or bitumen to and from the measuring valve casing 163 a vent pipe 178 (see Figs. 7 and 8) leads from the upper portion thereof, is inclined upwardly and outwardly through the left hand side plate 15 and extends thence upwardly to a point above the top of the melting tank 30. The movement of the valve 170 is limited by a dog 176' pivoted on the wall of the casing and engaging a notched collar 176ª on the shaft 172. This dog can be lifted and the valve turned over to drain the valve casing when desired.

When the machine is in operation the cut-off valve 153 at the rear bottom portion of the melting tank is open so that the melted asphalt or bitumen will pass through the pipe 162 into the measuring valve casing 163. By manipulating the levers 117, 117' and 176 on the left hand side of the machine the operator can readily provide the mixing tank with measured quantities of asphalt or bitumen and of sand and gravel and, when the same are mixed, the paving mixture can be discharged by shifting the lever 147 to open the discharge gate 142 at the bottom of the mixing tank. When the machine is not in operation the cut-off valve 153 is closed so that the asphalt or pitch will not clog the pipe 162 and the measuring valve casing 163.

The rear end of the melting tank is also provided with a discharge pipe 179 that leads from the bottom thereof outwardly through the right hand side plate 15 and is provided on its outer end with an ordinary globe valve 180. Its inner end is normally closed by a ball valve 181 fixed to the lower end of a rod 182. This rod extends upwardly through a guide bracket 183 in the tank and through a bracket 184 on the upper wall 22 of the tank. It is provided with a handle 185 on its upper end and a thumb screw 186 threaded through the bracket 184 is arranged to engage the rod and hold the ball valve in position. This valve normally closes the inner end of the pipe 179 so that the asphalt or pitch cannot clog therein. When the machine is not in operation the contents of the melting tank can be discharged, if desired, by opening the valves 180 and 181. The tank 30 is provided with a transverse partition 187 formed of wire screen immediately in front of the valves 153 and 181 (see Figs. 1 and 9), so that any refuse material in the asphalt or bitumen cannot pass into the paving mixture and cannot clog up the pipes 162 and 179.

The drier, fan, elevator and mixer are all driven from a main power shaft 188 (see Fig. 5) at the rear end of the machine. It is journaled in suitable bearings 189 mounted respectively upon a frame-work 190 upon the left hand side sill 1 and on a channel bar 191 on the right hand side sill. It is provided with a pulley 192 which may be belted to any suitable source of power. At this right hand end it is provided with a sprocket wheel 193 and a pulley 194. The sprocket wheel is connected by a chain 195 to the sprocket wheel 140 on one of the mixer shafts 132. The other mixer shaft is driven in the opposite direction by the intermeshing gears 139. The pulley 194 is connected by a belt 196 to a pulley 197 on the right hand end of the transverse countershaft 198 that is journaled in suitable bearings 199 at the upper portion of the machine directly in front of the hood 23. Adjacent the pulley 197 the shaft 198 is provided with a sprocket wheel 200 that is connected by a chain 201 to a sprocket wheel 210 upon the right hand end of a shaft 211. This shaft is journaled in sutable bearings 212 mounted upon angle bars 213 at the upper portion of the hood 23 and the driving sprocket wheel 105 at the upper end of the elevator is fixed to the shaft. The left hand end of the countershaft 198 is provided with a pulley 214 which is connected by a crossed belt 215, to a pulley 216 on the shaft 217 of the fan 91. This shaft is journaled in suitable bearings upon the framework 92 and upon a bracket 218 fixed to the fan casing. The left hand end of the main drive shaft 188 is provided with a beveled pinion 219 that meshes with a beveled gear 220 fixed to the rear end of the longitudinally extending counter shaft 221. This shaft is journaled in suitable bearings 222 mounted respectively upon the support 190 and upon two of the upright eye-bars 14. At its forward end the shaft is provided with a sprocket wheel 223 (see Figs. 8 and 9) and a chain 224 passes over this sprocket wheel, through an opening 225 in the left hand side plate 15 of the casing and around an annular sprocket wheel 226 on the rear end of the drying cylinder 32. By the mechanism described the drying cylinder, the centrifugal fan, the elevator and the blades of the mixing tank are continuously revolved during the operation of the machine.

The front end 16 of the casing that forms the front walls of the chamber 29 and of the drying melting chamber 31 extends downwardly, as most clearly shown in Fig. 6, below the side sills and forms the front end wall of the fire-box 45. The rotary drying cylinder 32 projects through an opening in the wall 16 and, to prevent the escape of the products of combustion through this opening, a ring 227 is fixed to the plate 16 about the opening and is provided with an inwardly projecting flange which is arranged inside of and overlaps an outwardly projecting flange on a ring 227' fixed to the drying cylinder 32. The flanges of these rings act as baffle plates to prevent the escape of the products of combustion. The ring 227 is also provided with a pair of outwardly projecting flanges that form an annular groove or seat for the fire brick 57 that line the end wall of the drying chamber and fire-box. The opposite end wall 228 of the fire-box extends upwardly to the horizontal partition formed by the plates 33, as shown in Fig. 1, and this wall, like the front wall of the fire-box and drying chamber, is lined with fire brick and it and the drying cylinder at this point are also provided with overlapping rings 227 and 227' (see Fig. 9) similar to those at the front end. The rear portion of the drying cylinder is thus arranged in an open sided chamber 229 formed between the vertical walls 28 and 228 and below the horizontal partition 33. The rear portion of the cylinder extends through the end walls of this chamber and opens at its extreme rear end into the elevator shaft 37, as shown in Figs. 1, 7, and 12. The chamber 229 does not communicate with any of the other chambers in the casing and the supporting ring 69 and rollers and the drive chain 224 and ring 226 therein are not directly exposed to the products of combustion. The forward end of the cylinder projects beyond the front end wall 16 of the casing, so that the supporting ring and rollers 64 and 65 for the front end of the drying cylinder are also unexposed to the products of combustion. Moreover, by this arrangement, the supporting and driving mechanism for the drying cylinder is readily accessible for repairs and the like.

The products of combustion pass upwardly from the fire-box 45 and around the drying cylinder 32 and pass from the chamber 31 through the openings controlled by the dampers 82 and 83 into the space in the chamber 29 around the bottom, sides and ends of the melting tank 30. The products of combustion escape from the chamber 29 at its front end to the stack 89 or to the fan 91. The damper 82 is located at the front end of the chamber 29 and the damper 83 at the rear end thereof so that the heat supplied to the melting tank in the chamber can be nicely regulated by shifting these dampers. For example, if more heat is required to melt the asphalt or bitumen in the tank 30 the damper 82 is closed and the damper 83 is opened so that all the products of combustion pass from the rear end of the chamber 29 to the front end thereof. If less heat is required the damper 83 can be closed and the damper 82 opened so that the products of combustion merely pass through the front portion of the chamber 29. It is important that means should be provided for regulating the temperature, since the asphalt or the like can be injured if too highly heated.

In the ordinary operation of the machine the stack 89 will be cut off by means of the sliding damper 96 and the products of combustion will be drawn into the fan 91 and projected therefrom through the pipes 93 and 94 into the interior of the drying cylinder 32 but, if it is desirable to reduce the amount of heat supplied to the drier, the fan can be stopped and the damper 96 opened so that the combustion gases will pass from the chamber 29 to the stack 89 at the front end of the machine.

In the ordinary operation of the machine, the combustion gases pass through the drying cylinder 32 and escape from the rear end thereof into the elevator shaft 37 and upwardly therethrough and over the upper edge of the partition wall 36 into the upper part of the chamber 39. From this point the combustion gases escape through a stack 230 or through a stack 231. The stack 230 is mounted upon the inclined top plate 26 of the hood 23 and leads upwardly from the upper end of the chamber 39 of the casing. A horizontal pipe 232 leads from the lower end of the stack 230 and opens tangentially into the upper cylindrical portion 233 of a centrifugal separator that is supported by angle bars 234 fixed to the side walls of the hood 23 and projecting laterally therefrom. The lower conical portion 233' of the centrifugal separator is connected at its lower end to a pipe 235. This pipe is inclined downwardly and forwardly, extends through the rear end wall 17 of the machine casing and opens into the upper end of the mixing tank 126 (see Figs. 1, 7 and 12). The stack 231 is mounted on the centrifugal separator and leads from the lower end thereof, as shown in Fig. 12. The stack 230 is provided, at its lower end, and above the pipe 232, with a sliding damper 236 and the connecting pipe 232 between the stack 230 and the centrifugal separator 233 is provided with a similar sliding damper 237. By opening one of these dampers and closing the other the products of combustion are caused to pass either directly to the stack 230 or first through the centrifugal separator 233 and then to the stack 231. The latter course will be the one ordinarily employed, but, in starting the fire and heating up the apparatus preliminary to its operation, it will often be convenient to cause the gases to pass off to the stack 230. By means of the separator 233, sand, clinkers, cinders and the like will be removed from the products of combustion and will be delivered into the mixing chamber 126 to form part of the paving material. This arrangement not only obviates the loss of material, but also prevents the escape of sand and cinders into the atmosphere which might render the operation of the apparatus objectionable in some localities.

The partition 36 between the elevator shaft and the chamber 39 is provided at its lower end with an opening 238 which is controlled by a sliding damper 239 (see Fig. 8). Ordinarily this damper is in closed position, but, in heating up the apparatus preparatory to its operation, this damper is opened and the sliding gate 149 in the bottom of the chamber 39 is closed so that the products of combustion pass from the rear end of the drying cylinder into the lower ends of the elevator shaft and of the chamber 39 and pass upwardly through both these chambers to the stacks. In this way the storing and measuring sand hoppers, the asphalt measuring valve and the mixing tank are heated, so that the sand and asphalt, when admitted thereto, will not be chilled. When once the machine is in full operation the parts in the chamber 39 will be kept hot by the hot sand and asphalt and the damper 239 is closed and the gate 149 is opened to permit the passage therethrough of the paving material from the mixing tank.

It should be noted that the parts of the apparatus are inclosed in the casing so that they can not become chilled, and that the products of combustion are economically and efficiently utilized in the drier and melting chambers and also in the rear portion of the apparatus. Loss of heat is thereby prevented and the asphalt mixture is properly delivered, as required, in a highly heated state.

When the apparatus is shut down over night, or for a few days, it is often desirable to maintain the asphalt or bitumen in the tank 30 in liquid condition. The main fire-box cannot be used economically for this purpose. In the present apparatus a small supplemental fire-box 240 is arranged on the right hand side of the machine opposite the elevator shaft 37 (see Figs. 7, 8, 10 and 11). This supplemental fire-box is formed of side walls 241 and 242, a back wall 243, a top wall 244 and a front wall 245. The front of the fire-box projects out over the adjacent side sill 1 and the side wall 15 of the main casing is cut away at this point. Grate bars 246 are supported in the lower portion of the fire-box upon angle bars 247 and the front is provided with a stoking door 248. A portion of the fire-box above the grate bars is lined with fire brick 57 that is held in place by bars 58 and bolts 59 similar to those employed in the main fire-box 45 and drying chamber 31. A flue 249 having a damper 250 therein leads from the upper portion of the supplemental fire-box into the lower rear end of the chamber 29 in which the melting tank 30 is located.

Ordinarily, no fire is maintained in the supplemental fire-box and the damper 250 is maintained in closed position. But when the apparatus is shut down for a short time the dampers 82 and 83 in the horizontal partition are closed, the damper 250 is opened and a fire built in the supplemental fire-box. The products of combustion pass therefrom through the flue 249 into the rear end of the chamber 29 and pass out of the front end thereof through the supplemental stack 89. In this way the asphalt or the like material in the tank 30 is kept in liquid condition.

The machine is strong and durable in construction and efficient in operation. The operating parts are readily accessible for making repairs and the like. The side walls 15 are provided at intervals with doors 251 (see Fig. 1) through which the interior of the machine casing is accessible for cleaning and the like. Similar doors 252 (see Fig. 5) are arranged in the rear end wall 17. The upper portion of the hood 23 is provided with a removable cap 253 which extends over the upper end of the elevator.

The weight of the machine is properly distributed upon the front and rear axles so that it can be readily transported from place to place and the paving mixture had at the location where it is to be applied. Adjustable diagonal brace bars 256 (see Fig. 1) extend between the side sills 1 and the upper ends of the uprights 14 that are arranged immediately above the rear axle. The chain wheel 106 at the lower end of the elevator is mounted on a transverse shaft 257 that is journaled in adjustable bearings 258. These bearings are held in position in guide-ways 259 by adjusting screws 260. The angle bars 27 at the bottom of the hood 23 are removably bolted to the angle bars 21 at the upper rear portion of the main casing, so that the hood, the main stacks 230 and 231 and the centrifugal separator 233 can be taken down, if necessary when the apparatus is to be transported, so that the machine will pass under viaducts and other overhead structures. The small supplemental stack 89 at the front of the machine can also be removed if necessary.

It is obvious that numerous changes can be made in the details set forth without departure from the essentials of the invention as defined in the claims.

We claim as our invention:—

1. In a paving plant, the combination of a drier, a fire box below said drier, a melting tank above said drier, flues for conducting the combustion gases from said fire box successively around said drier and said melting tank, a flue leading from a point adjacent the upper end of said tank downwardly to one end of said drier, and a stack communicating with the opposite end of said drier, substantially as described.

2. In a portable paving plant, the combination with a casing having a fire box at its lower portion, a drier in said casing above said fire box, a melting tank in said casing above said drier, a pipe leading from the upper end of said casing downwardly to one end of said drier, a fan in said pipe for withdrawing the combustion gases from the upper portion of said casing and for forcing the same through said drier, and a stack communicating with the opposite end of said drier, substantially as described.

3. In a portable paving plant, the combination of a casing having an upper melting chamber and a lower drying chamber communicating with said melting chamber and provided with a fire-box in its lower portion, a rotary drier in said lower chamber above said fire-box, a melting tank in said upper chamber, a pipe for conducting the combustion gases from the upper portion of said melting chamber, said pipe opening into one end of said drier, and a stack communicating with the opposite end of said drier, substantially as described.

4. In a paving plant, the combination of a casing, having an upper melting chamber and a lower drying chamber communicating with said melting chamber and provided with a fire box in its lower portion, a drier in said lower chamber above said fire box, a melting tank in said upper chamber, a flue leading from said upper chamber downwardly to one end of said drier, a fan in said pipe for withdrawing the combustion gases from said melting chamber and for forcing the same through said drier, a stack communicating with the opposite end of said drier, and drive mechanism for operating said fan and drier, substantially as described.

5. In a portable paving plant, the combination of a casing having an upper melting chamber and a lower drying chamber communicating with said melting chamber and provided with a fire-box in its lower portion, a rotary drier in said lower chamber above said fire-box, a melting tank in said upper chamber, a fan for withdrawing the combustion gases from said melting chamber, a discharge pipe leading from said fan and opening into the inlet end of said drier, an elevator shaft communicating at its lower end with the outlet end of said drier, an elevator therein, a stack communicating with the upper portion of said elevator shaft, and drive mechanism for operating said drier, fan and elevator, substantially as described.

6. In a portable paving plant, the combination of a casing, a partition dividing said casing into an upper melting chamber and a lower drying chamber, said chambers communicating at opposite ends by damper-controlled openings, and said drying chamber having a fire-box at its lower portion, a drier in said lower chamber above said fire-box, a melting tank in said upper chamber, means for conducting the combustion gases from one end of said melting chamber to one end of said drier, and a stack communicating with the opposite end of said drier, substantially as described.

7. In a paving plant, the combination of a casing, a partition dividing said casing into an upper melting chamber and a lower drying chamber and having openings at its opposite ends, dampers controlling said openings, a fire box at the lower portion of said drying chamber, a drier in said drying chamber above said fire box, a melting tank in said upper chamber, a flue for conducting the combustion gases from one end of said melting chamber to one end of said drier, and a stack communicating with the opposite end of said drier, substantially as described.

8. In a paving plant, the combination with a casing, a partition dividing said casing into an upper melting chamber and a lower drying chamber and having openings at its opposite ends through which communication is established between said chambers, dampers controlling said openings, a fire box in the lower portion of said drying chamber, a drier in said chamber above said fire box, a melting tank in said upper chamber, a supplemental fire box having means for conducting the combustion gases therefrom directly into one end of said melting chamber, a flue leading from the opposite end of said melting chamber to said drier, a fan in said flue for drawing the combustion gases from said melting chamber and forcing the same through said drier, a main stack communicating with the opposite end of said drier, and a supplemental stack leading from said flue, substantially as described.

9. In a paving plant, the combination of a fire box, a drying chamber communicating therewith, a drier in said chamber, a melting chamber communicating with said drying chamber, a tank in said melting chamber, a flue leading from said melting chamber to one end of said drier and a stack leading from the opposite end of said drier, the parts being arranged to conduct the combustion gases in succession around said drier and said tank, thence through said flue and drier to said stack.

10. In a paving plant, the combination with a drying chamber, a melting chamber communicating therewith, a drier in said drying chamber, a tank in said melting chamber, a fire box for supplying combustion gases to said drying chamber, a flue leading from said melting chamber to said drier, and a fan in said flue for drawing the combustion gases successively through said drier and for forcing the same through said drier, substantially as described.

11. In a paving plant, the combination of a drying chamber having a fire box in its lower portion, a rotary drier in said chamber above said fire box, a melting chamber communicating with said drying chamber, an elevator shaft at the outlet end of said drier, an elevator therein, a fan for withdrawing the combustion gases from said melting chamber and for forcing the same through said drier to said elevator shaft, and drive mechanism for operating said drier, said elevator and said fan, substantially as described.

12. In a paving plant, the combination with a drying chamber having a fire box in its lower portion, a separate melting chamber, having openings at its opposite ends leading into the opposite ends of said drying chamber, dampers controlling said openings, a tank in said melting chamber, a drier in said drying chamber and above said fire box, and a flue for conducting the combustion gases from one end of said melting chamber, substantially as described.

13. In a paving plant, the combination of a drying chamber, having a fire box in its lower portion, a drier in said chamber above said fire box, a separate melting chamber communicating with said drying chamber, a tank in said melting chamber, a pipe leading from said melting chamber and opening into one end of said drier, a main stack communicating with the opposite end of said drier, and a supplemental stack leading from said melting chamber, substantially as described.

14. In a paving plant, the combination with a drying chamber, a drier therein, a melting chamber communicating with said drying chamber, a tank in said melting chamber, a main fire box for supplying combustion gases to said drying and melting chambers, a supplemental fire box having means for delivering the combustion gases therefrom directly to said melting chamber, and a flue for conducting the combustion gases from both of said fire boxes and from said melting chamber, substantially as described.

15. In a portable paving plant, the combination of a casing, a partition dividing said casing into upper and lower chambers and having an opening therein, a melting tank in said upper chamber, a drier in said lower chamber, a main fire box in the lower portion of said lower chamber, a supplemental fire box having means for conducting the combustion gases therefrom directly into said upper melting chamber, and a stack for the combustion gases from both fire boxes leading from said upper chamber, substantially as described.

16. In a portable paving plant, the combination of a casing, a horizontal partition dividing said casing into upper and lower chambers, the latter chamber having a fire box formed in its lower portion, said partition having openings at the opposite ends of said upper and lower chambers, dampers controlling said openings, a drier in said lower chamber and a melting tank in said upper chamber around which the combustion gases successively pass, and a discharge flue for the combustion gases leading from one end of said upper chamber, substantially as described.

17. In a paving plant, the combination with a drier, a melting tank and a main fire-box for heating said drier and said tank, of communicating chambers wherein said drier and tank are located and through which the combustion gases from said main fire-box successively pass, a supplemental fire-box communicating with the chamber containing said melting tank, and means for conducting the combustion gases from said latter chamber, substantially as described.

18. In a paving plant, the combination of a rotary drier, a melting tank, a mixing tank, a fire-box, a dust separator, a stack communicating with said separator, means for conducting the combustion gases through said drier in contact with the material therein and thence through said separator to said stack, and a conduit for conducting the material collected in said separator to said mixing tank, substantially as described.

19. In a portable paving plant, the combination with the supporting wheels and sills, of a casing having upper and lower communicating chambers, a melting tank in said upper chamber, a drier in said lower chamber, a fire-box opening into said lower chamber, a pipe for conducting the combustion gases from said upper chamber, said pipe opening into one end of said drier, a dust separator communicating with the opposite end of said drier, and a stack leading from said dust separator, substantially as described.

20. In a portable paving plant, the combination with the supporting wheels and sills, of a drying chamber, a drier therein, a melting chamber above said drying chamber, a tank therein, an elevator shaft to one side of said chambers, an elevator therein, a fire-box and means for conducting the combustion gases successively through said chambers and through said drier and elevator shaft, substantially as described.

21. In a portable paving plant, the combination with the supporting wheels and sills, of a drying chamber, a rotary drier therein, a melting chamber above said drying chamber, a tank therein, an elevator shaft to one side of said chambers, an elevator therein, a chamber communicating with the upper end of said elevator shaft, a storage tank in the upper portion of said latter chamber and a mixer in its lower portion, a stack communicating with the upper portion of said elevator shaft, a fire-box, means for conducting the combustion gases successively through said chambers and through said drier and elevator shaft to said stack, and drive mechanism for operating said drier, said elevator and said mixer, substantially as described.

22. In a portable paving plant, the combination of a drier, an elevator shaft communicating at its lower end with the outlet of said drier, an elevator therein, a storing chamber communicating at its upper end with the upper end of said elevator shaft, a mixing chamber below said storing chamber, a mixer therein, a damper-controlled opening leading from the lower end of said elevator shaft into said mixing chamber, a fire-box, means for delivering the combustion gases to the inlet end of said drier, and a stack communicating with the upper ends of said elevator shaft and said storing chamber, substantially as described.

23. In a portable paving plant, the combination of a drier, an elevator shaft communicating at its lower end with the outlet of said drier, an elevator therein, a storing chamber communicating at its upper end with the upper end of said elevator shaft, a mixing chamber below said storing chamber, a mixer therein, a measuring hopper and a measuring valve in said mixing chamber above said mixer, a melting tank communicating with said measuring valve, a fire-box, and means for conducting the combustion gases around said drier and tank and through said elevator shaft and said mixing and storing chambers, substantially as described.

24. In a portable paving plant, the combination with the supporting wheels and sills, of a casing divided into upper and lower communicating chambers, a melting tank in said upper chamber, a drier in said lower chamber, an elevator shaft, communicating at its lower end with the outlet of said drier, an elevator therein, a storing chamber communicating at its upper end with the upper end of said elevator shaft, a mixing chamber below said storing chamber, a mixer in the lower portion of said latter chamber, a measuring hopper and a measuring valve in the upper portion of said mixing chamber, said valve communicating with said melting tank, a fire-box opening into said drying chamber, means for conducting the combustion gases from the said upper chamber and through said drier and elevator shaft, and means for temporarily passing a portion of the gases through said mixing and storing chambers, substantially as described.

25. In a portable paving plant, the combination with the supporting wheels and sills, of a casing mounted on said sills having upper and lower communicating chambers at one end, an elevator shaft in said casing adjacent one end of said chambers, a storing chamber in said casing and communicating at its upper end with the upper end of said elevator shaft, a mixing chamber in said casing below said storing chamber, a melting tank in said upper chamber, a rotary drier in said lower chamber discharging into the lower end of said elevator shaft, an elevator in said shaft, a mixer in said mixing chamber, a measuring valve and a measuring hopper in said latter chamber above said mixer, said valve being below the level of said tank and communicating therein, a fire box, and means for conducting the combustion gases successively through said chambers and elevator shaft, substantially as described.

26. In a portable paving plant, the combination with the supporting wheels and sills, of a casing mounted on said sills having upper and lower communicating chambers at one end, an elevator shaft in said casing adjacent one end of said chambers, a storing chamber in said casing and communicating at its upper end with the upper end of said elevator shaft, a mixing chamber in said casing below said storing chamber, a melting tank in said upper chamber, a drier in said lower chamber discharging into the lower end of said elevator shaft, an elevator in said shaft, a mixer in said mixing chamber, a measuring valve and a measuring hopper in said latter chamber above said mixer, said valve being below the level of said tank and communicating therewith, a fire-box, means for conducting the combustion gases successively through said chambers and elevator shaft, and drive mechanism for operating said drier, elevator and mixer, substantially as described.

27. In a portable paving plant, the combination with a casing having upper and lower communicating chambers, a melting tank in said upper chamber, a rotary drier in said lower chamber, a feed hopper, a conveyer for delivering material from said hopper to one end of said drier, a fire-box communicating with said lower chamber, a fan, a pipe connecting said upper chamber to the inlet of said fan, and a pipe connected to the outlet of said fan surrounding said conveyer for delivering the combustion gases into the inlet end of said drier, and drive mechanism for operating said drier, said conveyer and said fan, substantially as described.

28. In a portable paving plant, the combination with the supporting wheels and sills, of a casing mounted on said sills having a drying chamber therein provided with a fire-box in its lower portion, a rotatable drying cylinder in said chamber projecting through openings in the end walls thereof, said cylinder and the end walls of said drying chamber having overlapping baffle plates to prevent the escape of combustion gases from said chamber, a second chamber above said drying chamber and communicating therewith, a melting tank in said upper chamber, and means for withdrawing the combustion gases from said upper chamber and for forcing the same through said cylinder in contact with the material therein, substantially as described.

29. In a portable paving plant, the combination of a melting tank, a drier, an elevated storage hopper, an elevator for conveying the material from said drier to said hopper, a mixer, a measuring hopper between said storage hopper and said mixer, a measuring valve above said mixer, a pipe connecting said valve to said melting tank, and a slide valve in said tank for closing the inner end of said pipe, substantially as described.

30. In a portable paving plant, the combination of a melting tank, a drier, an elevated storage hopper, an elevator for conveying the material from said drier to said hopper, a mixer, a measuring hopper between said storage hopper and said mixer, a measuring valve above said mixer, a pipe connecting said valve to said melting tank, a drain pipe leading from said tank and valves at the inner ends of said pipes, substantially as described.

31. In a portable paving plant, the combination of a melting tank, a drier, an elevated storage hopper, an elevator for conveying the material from said drier to said hopper, a mixer, a measuring hopper between said storage hopper and said mixer, a measuring valve above said mixer and below the level of said tank, an inlet pipe for said valve and a drain pipe connected to one end of said tank, and a screen in said tank adjacent the inlet ends of said pipes, substantially as described.

32. In a portable paving plant, the combination of a melting tank, a drier, an elevated storage hopper, an elevator for conveying the material from said drier to said hopper, a mixer, a measuring hopper between said storage hopper and said mixer, a measuring valve below the level of said tank and above mixer, an inclosing casing for said tank, drier, elevator and mixer, means for heating the interior of said casing, and means extending to the exterior thereof for operating and controlling said parts, substantially as described.

33. In a portable paving plant, the combination with the supporting wheels and sills, of a casing mounted on said sills, a drier and a superposed melting tank in said casing, a mixer and a superposed storage chamber in said casing at one end, an intermediate elevator shaft leading from the discharge end of said drier to said storage tank, a removable hood on said casing forming the upper portion of said elevator shaft and of said storage chamber, an elevator in said shaft, and drive mechanism for operating said drier, elevator and mixer, substantially as described.

34. In a portable paving plant, the combination with the supporting wheels and sills, of a casing mounted on said sills, a drier and a superposed melting tank in said casing, a mixer and a superposed storage chamber in said casing at one end, an intermediate elevator shaft leading from the discharge end of said drier to said storage tank, a removable hood on said casing forming the upper portion of said elevator shaft and of said storage chamber, an elevator in said shaft, a fire-box for heating the interior of said casing, and a stack leading from said hood, substantially as described.

35. In a portable paving plant, the combination with the supporting wheels and sills, of a casing mounted on said sills, a drier and a superposed melting tank in said casing, a mixer and a superposed storage chamber in said casing at one end, an intermediate elevator shaft leading from the discharge end of said drier to said storage tank, a removable hood on said casing forming the upper portion of said elevator shaft and of said storage chamber, an elevator in said shaft, and a measuring valve and measuring hopper in said casing above said mixer, discharge valves for said storing and measuring hoppers and for said mixer, means for heating the interior of said casing and means extending to the exterior of said casing for operating said valves, substantially as described.

36. In a portable paving plant, the combination with supporting wheels and sills, of a casing mounted on said sills divided at one end into upper and lower melting and drying chambers and at its opposite end into upper and lower storage and mixing chambers with an intermediate elevator shaft between said chambers, a tank in said melting chamber, a drier in said drying chamber, an elevator in said shaft for delivering the material discharged from said drier to said storage chamber, a mixer in said mixing chamber, a measuring hopper and a measuring valve in the upper portion of said mixing chamber above said mixer, said valve communicating with said tank, a fire box in the lower portion of said drying chamber, means for conducting the combustion gases successively through said drying chamber, said melting chamber and said drier to said elevator shaft, a stack leading from the upper portions of said elevator shaft and said storage chamber, and means for temporarily passing a portion of the gases through said mixing and storing chambers, substantially as described.

37. In a portable paving plant, the combination with supporting wheels and sills, of a casing mounted on said sills divided at one end into upper and lower melting and drying chambers and at its opposite end into upper and lower storage and mixing chambers with an intermediate elevator shaft between said chambers, a tank in said melting chamber, a drier in said drying chamber, an elevator in said shaft for delivering the material discharged from said drier to said storage chamber, a mixer in said mixing chamber, a measuring hopper and a measuring valve in the upper portion of said mixing chamber above said mixer, said valve communicating with said tank, a fire box in the lower portion of said drying chamber, and means for drawing the combustion gases successively through said drying and melting chambers and for forcing the same through said drier and said elevator shaft, substantially as described.

38. In a portable paving plant, the combination with supporting wheels and sills, of a casing mounted on said sills divided at one end into upper and lower melting and drying chambers and at its opposite end into upper and lower storage and mixing chambers with an intermediate elevator shaft between said chambers, a tank in said melting chamber, a drier in said drying chamber, an elevator in said shaft for delivering the material discharged from said drier to said storage chamber, a mixer in said mixing chamber, a measuring hopper and a measuring valve in the upper portion of said mixing chamber above said mixer, said valve communicating with said tank, a fire box in the lower portion of said drying chamber, said drying chamber communicating at its upper end with the lower end of said melting chamber, a pipe for leading the combustion gases from said melting chamber, said pipe opening into the inlet end of said drier, and a stack leading from the upper ends of said elevator shaft and said storage chamber, the lower end of said stack communicating with the lower portion of said mixing chamber through a damper controlled opening, substantially as described.

LINN WHITE.
HARRY S. RICHARDS.

Witnesses:
ELEANOR HAGENOW,
KATHARINE GERLACH.